United States Patent
Hsu et al.

(10) Patent No.: US 11,388,742 B2
(45) Date of Patent: *Jul. 12, 2022

(54) SCHEDULING METHOD FOR USER EQUIPMENT END OF NARROWBAND INTERNET OF THINGS

(71) Applicant: Suzhou PanKore Integrated Circuit Technology Co. Ltd., Suzhou (CN)

(72) Inventors: Chao-Yuan Hsu, Taipei (TW); Jui-Peng Tsai, Taoyuan (TW); Tien-Ke Huang, Hsinchu (TW)

(73) Assignee: SUZHOU PANKORE INTEGRATED CIRCUIT TECHNOLOGY CO. LTD., Suzhou (CN)

( * ) Notice: Subject to any disclaimer, the term of this patent is extended or adjusted under 35 U.S.C. 154(b) by 106 days.

This patent is subject to a terminal disclaimer.

(21) Appl. No.: 17/065,556

(22) Filed: Oct. 8, 2020

(65) Prior Publication Data
US 2021/0112579 A1    Apr. 15, 2021

(30) Foreign Application Priority Data
Oct. 15, 2019    (TW) .................................. 108137128

(51) Int. Cl.
*H04W 72/12* (2009.01)
*H04W 72/04* (2009.01)
*H04W 4/80* (2018.01)

(52) U.S. Cl.
CPC ......... *H04W 72/1273* (2013.01); *H04W 4/80* (2018.02); *H04W 72/042* (2013.01); *H04W 72/0446* (2013.01)

(58) Field of Classification Search
CPC . H04W 72/1273; H04W 4/80; H04W 72/042; H04W 72/0446; H04W 4/70; H04L 67/12; H04L 1/08
See application file for complete search history.

(56) References Cited

U.S. PATENT DOCUMENTS

| 2018/0048985 A1* | 2/2018 | Park | .................. | H04W 4/06 |
| 2020/0245317 A1* | 7/2020 | Hwang | ................ | H04W 68/02 |
| 2021/0045099 A1* | 2/2021 | Shin | .................. | H04L 1/18 |

FOREIGN PATENT DOCUMENTS

WO   WO 2018/063763 A1   4/2018

\* cited by examiner

*Primary Examiner* — Jung H Park
(74) *Attorney, Agent, or Firm* — WPAT, PC (57) ABSTRACT

A scheduling method for user equipment (UE) of NB-IoT is provided. The scheduling method includes: synchronizing to a cell; receiving from the cell at least one system information parameter that includes a maximum number of repetitions, periods, and offsets of NPDCCH search spaces; establishing a list according to the at least one system information parameter, the list recording multiple available subframes and each available subframe being labeled with an index; calculating a numeral of a start subframe of target NPDCCH repetitions according to a numeral of a target subframe, the period, and the offset; searching the list for a start index corresponding to the start subframe using the numeral of the start subframe; searching the list for a target index corresponding to the target subframe; determining whether the target subframe is within the interval of the target NPDCCH repetitions; and determining whether the target subframe is an NPDCCH candidate subframe.

12 Claims, 6 Drawing Sheets

SCHEDULING METHOD FOR USER EQUIPMENT END OF NARROWBAND INTERNET OF THINGS

BACKGROUND OF THE INVENTION

1. Field of the Invention

The present invention generally relates to the Narrowband Internet of Things (NB-IoT), and, more particularly, to the scheduling method for the user equipment (UE) of the NB-IoT.

2. Description of Related Art

Figure 1:
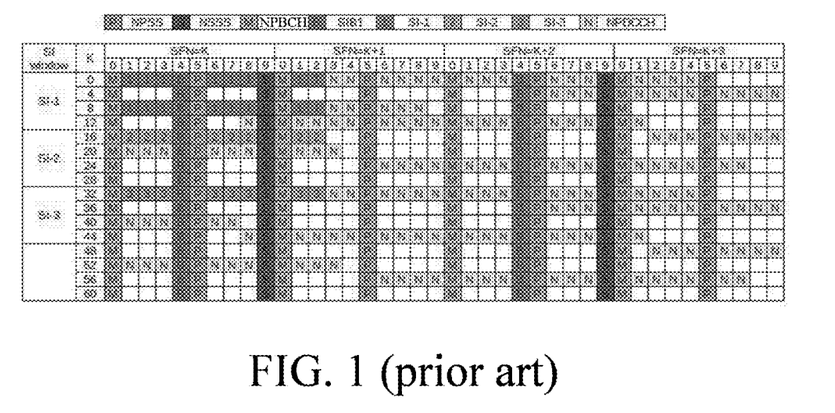
FIG. 1 illustrates a schematic diagram of the conventional NB-IoT downlink scheduling.

FIG. 1 illustrates a schematic diagram of the conventional NB-IoT downlink scheduling. In FIG. 1, "SFN" is short for the system frame number, also known as the radio frame number; "SI window" (SI scheduling window) is used to indicate the type of the system information (SI) under scheduling (e.g., the three types of SI shown in FIG. 1: SI-1, SI-2 and SI-3). Each system frame includes 10 subframes, and the types of channels, information or signals that each subframe can carry include: Narrowband Primary Synchronization Signal (NPSS), Narrowband Secondary Synchronization Signal (NSSS), Narrowband Physical Broadcast Channel (NPBCH), Narrowband System Information Block Type1 (SIB1-NB, abbreviated as SIB1), system information type 1 (SI-1), system information type 2 (SI-2), system information type 3 (SI-3), and Narrowband Physical Downlink Control Channel (NPDCCH). The legends for these channels are shown at the top of FIG. 1. For example, subframe 0 (the subframe numbered 0 (zero), that is, subframe 0 of the 0th SFN) carries NPBCH (symbol "M"), subframe 44 (the subframe numbered 44, that is, the fourth subframe of the fourth SFN) carries SIB1 (symbol "B"), and subframe 121 (the subframe numbered 121, that is, the first subframe of the twelfth SFN) is not in use (blank).

Because NPSS, NSSS, NPBCH and SIB1 appear at fixed positions within certain periods in the above channels, information or signals, the type of the channel, information or signal of the subframe can be known from the numeral of the subframe. For example, NPSS appears in the 5th subframe of each SFN, NSSS appears in the 9th subframe of even SFNs, NPBCH appears in the 0th subframe of each SFN, and SIB1 appears in the fourth subframe in every other SFN (in this example, the period of SIB1 is 16 SFNs).

Because NPSS, NSSS, NPBCH, and SIB1 have higher priorities than SI-x (x being 1, 2, or 3) and NPDCCH, the subframes of NPSS, NSSS, NPBCH, and SIB1 are determined first, and then SI-x and NPDCCH use the remaining unused subframes according to their priorities (SI-x having a higher priority than NPDCCH). For example, SI-1 appears in the starting SI scheduling window with SFN=0, uses subframes {1, 2, 3, 6, 7, 8, 11, 12}, and repeats after eight radio frames. After all the SI-x have been arranged, the NPDCCH search spaces are arranged in the remaining subframes.

In the example of FIG. 1, a group of NPDCCH search spaces appears once every 64 subframes (i.e., the period T=64 subframes), and each appearance occupies 16 subframes (i.e., the maximum number of repetitions $R_{max}$=16 subframes). The maximum number of repetitions is a parameter set by the cell for NPDCCH, and the actual number of repetitions may vary in various NPDCCH transmissions. The actual number of repetitions is determined by the cell based on the channel conditions of the UE. Theoretically, the first NPDCCH repetitions starts from subframe 0, but it actually starts from subframe 13 and uses 16 subframes {13, 14, 16, 17, 18, 19, 21, 22, 23, 26, 27, 28, 31, 32, 33, 34} because NPSS, NSSS, NPBCH, SIB1 and S1-1 have higher priorities than NPDCCH. Similarly, the second NPDCCH repetitions theoretically starts from subframe 64 (because of the period T=64 subframes), but it actually starts from subframe 66 and uses 16 subframes {66, 67, 68, 71, 72, 73, 74, 76, 77, 78, 79, 93, 94, 96, 97, 98}.

In the example of FIG. 1, the offset of NPDCCH is 0 (zero) subframes. If the offset were 3 subframes, the second NPDCCH repetitions would start from subframe 67, whereas the first NPDCCH repetitions would still start from subframe 13 because subframes 3 to 12 are already in use.

The NB-IoT UE needs to know the following pieces of information when scheduling:

1. to know whether a certain target subframe is an NPDCCH candidate subframe, and if it is, to further know which subframe in an NPDCCH repetitions is the target subframe (i.e., to know the ordinal position of the target subframe in the NPDCCH repetitions). Taking the scheduling of FIG. 1 as an example, the target subframe numbered 14 is the second subframe of the first NPDCCH repetitions, and the target subframe numbered 71 is the fourth subframe of the second NPDCCH repetitions.
2. to know the start subframe of the NPDCCH repetitions closest to the target subframe. Taking the scheduling of FIG. 1 as an example, the start subframe of the first NPDCCH repetitions is subframe 13 and the start subframe of the second NPDCCH repetitions is subframe 66.
3. to know the end subframe of the NPDCCH repetitions closest to the target subframe. Taking the scheduling of FIG. 1 as an example, the end subframe of the first NPDCCH repetitions is subframe 34 and the end subframe of the second NPDCCH repetitions is subframe 98.

In order to obtain the pieces of information mentioned above, the UE needs to check, from the start of an NPDCCH repetitions (i.e., the subframe numbered T*L+O, where T is the period, O is the offset and L=0, 1, 2, 3 . . . ), one by one whether a subframe is not in use and can be used for downlink transmission (which is described in the "downlinkBitmap-r13" information of SIB1). Once a subframe is confirmed to be free (not in use) and usable for downlink transmission, that subframe can be arranged to receive the NPDCCH. The above method is referred to as the "iteration over subframes" algorithm in this specification.

The UE needs to obtain the pieces of information mentioned above within one subframe (which is about 1 ms), meanwhile, the UE has to complete other tasks in the same subframe which include the scheduling and control in the physical layer (PHY). In other words, the UE has to perform a large number of calculations within a limited time, and the number of iterations performed in the above-mentioned "iteration over subframes" algorithm increases with the maximum number of repetitions $R_{max}$, which may be as high as 2048.

Therefore, the UE, especially the low-cost and low-power-consumption UE, needs a more efficient scheduling method to deal with the above-mentioned limitations or requirements that may impose heavy loads on the UE.

SUMMARY OF THE INVENTION

In view of the issues of the prior art, an object of the present invention is to provide a scheduling method for the NB-IoT UE, so as to make an improvement to the prior art.

A scheduling method for user equipment (UE) of Narrowband Internet of Things (NB-IoT) is provided. The method includes the following steps: synchronizing with a cell; receiving at least one system information parameter from the cell, wherein the at least one system information parameter includes a maximum number of repetitions, a period and an offset of Narrowband Physical Downlink Control Channel (NPDCCH) search spaces; establishing a list based on the at least one system information parameter, wherein a plurality of available subframes is directly or indirectly listed in the list, and each available subframe is labeled with an index; calculating a numeral of a start subframe of a target NPDCCH repetitions based on a numeral of a target subframe, the period and the offset; using the numeral of the start subframe to search the list for a start index corresponding to the start subframe; searching the list for a target index corresponding to the target subframe; determining whether the target subframe is within an interval of the target NPDCCH repetitions based on a determination as to whether a difference between the start index and the target index is smaller than the maximum number of repetitions; and determining whether the target subframe is an NPDCCH candidate subframe based on the target index and the numeral of the target subframe.

A scheduling method for user equipment (UE) of Narrowband Internet of Things (NB-IoT) is provided. The method includes the following steps: synchronizing with a cell; receiving at least one system information parameter from the cell, wherein the at least one system information parameter includes a maximum number of repetitions, a period and an offset of Narrowband Physical Downlink Control Channel (NPDCCH) search spaces; establishing a list based on the at least one system information parameter, wherein a plurality of available subframes is directly or indirectly listed in the list, and each available subframe is labeled with an index; calculating a numeral of a first start subframe of a target NPDCCH repetitions based on a numeral of a target subframe, the period and the offset; using the numeral of the first start subframe to search the list for a start index corresponding to the first start subframe; searching the list for a target index corresponding to the target subframe; determining whether the target subframe is within an interval of the target NPDCCH repetitions based on a determination as to whether a difference between the start index and the target index is smaller than the maximum number of repetitions; and searching for the first start subframe of the target NPDCCH repetitions, or searching for a second start subframe of a next NPDCCH repetitions. The next NPDCCH repetitions immediately follows the target NPDCCH repetitions.

A scheduling method for user equipment (UE) of Narrowband Internet of Things (NB-IoT) is provided. The method includes the following steps: synchronizing with a cell; receiving at least one system information parameter from the cell, wherein the at least one system information parameter includes a maximum number of repetitions, a period and an offset of Narrowband Physical Downlink Control Channel (NPDCCH) search spaces; establishing a list based on the at least one system information parameter, wherein a plurality of available subframes is directly or indirectly listed in the list, and each available subframe is labeled with an index; calculating a numeral of a start subframe of a target NPDCCH repetitions based on a numeral of a target subframe, the period and the offset; using the numeral of the start subframe to search the list for a start index corresponding to the start subframe; searching the list for a target index corresponding to the target subframe; determining whether the target subframe is within an interval of the target NPDCCH repetitions based on a determination as to whether a difference between the start index and the target index is smaller than the maximum number of repetitions; and searching for a first end subframe of the target NPDCCH repetitions, or searching for a second end subframe of a next NPDCCH repetitions. The next NPDCCH repetitions immediately follows the target NPDCCH repetitions.

According to the present invention, the scheduling method for the NB-IoT UE improves the scheduling efficiency of the UE by establishing lists and searching the lists. In comparison with the conventional technology, because the scheduling method of the present invention does not need to check the subframes one by one in the time domain, the performance of the UE is improved so that the UE can complete all necessary calculations in a subframe.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

Some or all of the processes of the scheduling method may be implemented by software and/or firmware and can be performed by the NB-IoT UE or its equivalent. A person having ordinary skill in the art can choose components or steps equivalent to those described in this specification to carry out the present invention, which means that the scope of this invention is not limited to the embodiments in the specification.

Figure 2:
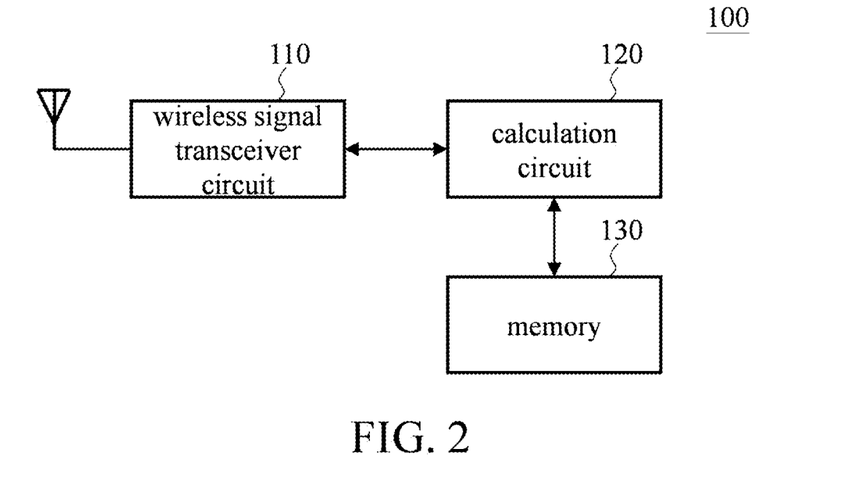
FIG. 2 is a functional block diagram of NB-IoT UE according to an embodiment of the present invention.
Figure 3:
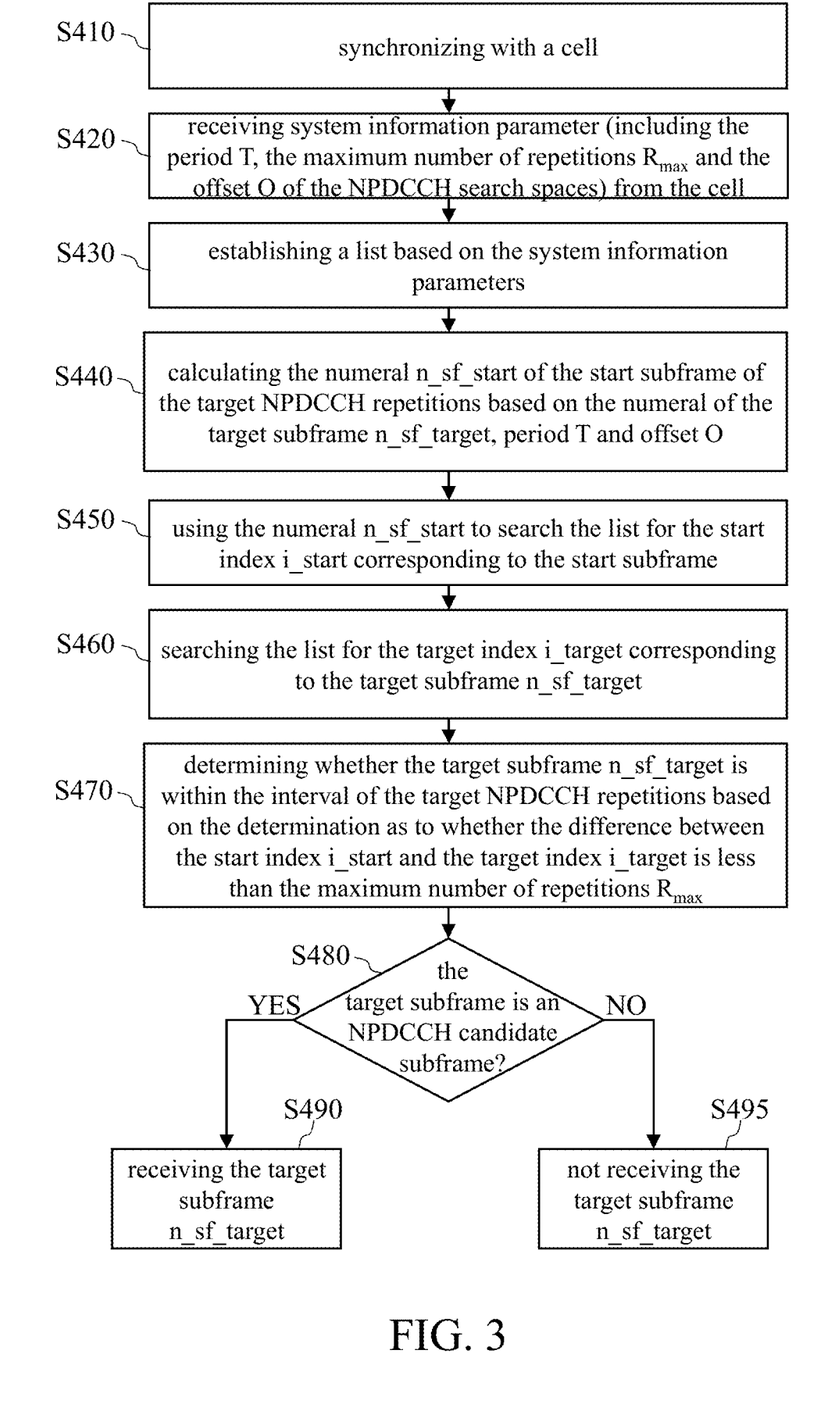
FIG. 3 illustrates a flowchart of the scheduling method for the UE according to an embodiment of the present invention.

FIG. 2 is a functional block diagram of NB-IoT UE according to an embodiment of the present invention. The UE 100 includes a wireless signal transceiver circuit 110, a calculation circuit 120 and a memory 130. The calculation circuit 120 may be a circuit or an electronic component with program execution capability, such as a central processing unit (CPU), a microprocessor, or a micro-processing unit. The calculation circuit 120 realizes the functions of the UE 100 by executing the program codes or program instructions stored in the memory 130. FIG. 3 is a flowchart of the scheduling method for the UE according to an embodiment of the present invention. The calculation circuit 120 performs the flow of FIG. 3 to know whether a target subframe n_sf_target is an NPDCCH candidate subframe. Reference is made to FIG. 2 and FIG. 3 for the following discussions.

Step S410: The UE 100 is synchronized with a cell (not shown). The calculation circuit 120 receives the signals from the cell using the wireless signal transceiver circuit 110 and synchronizes with the cell based at least on NPSS and NSSS. The details of the synchronization between the UE 100 and the cell are well known to people having ordinary skill in the art and thus omitted for brevity.

Step S420: The calculation circuit 120 receives at least one system information parameter from the cell through the wireless signal transceiver circuit 110. The system information parameters are, for example, NPSS, NSSS, NPBCH, SIB1, and SI-x, and the system information parameters include the period T, the maximum number of repetitions $R_{max}$ and the offset O of the NPDCCH search spaces. People having ordinary skill in the art can obtain, from the system information parameters, the period T, the maximum number of repetitions $R_{max}$ and the offset O of the NPDCCH search spaces according to the NB-IoT specifications, and the details are omitted for brevity.

Step S430: The calculation circuit 120 establishes a list based on the system information parameters, and multiple subframes are listed in the list. More specifically, the calculation circuit 120 can learn the subframes (and the numerals thereof) occupied by NPSS, NSSS, NPBCH, SIB1 and SI-x based on the system information parameters. In other words, the calculation circuit 120 can learn the subframes that can be used for downlink transmission and are not in use (which are referred to as available subframes) and their numerals. For example, table 1 is an example of the list corresponding to the scheduling in FIG. 1.

numerals of the available subframes are the elements of the array whereas and the indices are the indices of the array.

Some functions are defined herein for the purpose of clearer description of this invention. These functions can be implemented as segments of the program codes or program instructions stored in the memory 130.

1. The function subfn2index(n_sf) which is used for finding the index of the available subframe that is closet to and not smaller than the subframe n_sf. For example, subfn2index(13)=0, subfn2index(15)=2, and subfn2index(20)=6.
2. The function index2subfn(i) which is used for finding the available subframe of index i. For example, index2subfn(2)=16 and index2subfn(25)=48.
3. The function distance(i1, i2) which is used for finding the difference (i1−i2) between index i1 and index i2. This difference represents the total number of available subframes between index i1 and index i2. For example, distance(0, 1)=1−0=1 and distance(32, 37)=37−32=5.
4. The function add(i, d) which is used for finding the index that is d available subframes away from index i (namely, d−1 available subframes between the two indices). For example, add(1, 2)=1+2=3.

Step S440: Calculating the numeral n_sf_start of the start subframe of the target NPDCCH repetitions based on the numeral of the target subframe n_sf_target, period T and offset O. In this step, the calculation circuit 120 may calculate the numeral n_sf_start based on equation (1).

$$n\_sf\_start = [n\_sf \div T] \times T + O \quad (1)$$

For example, when the numeral of the target subframe n_sf_target is 77, the maximum number of repetitions $R_{max}$=16, the period T=64 and the offset O=0, the numeral n_sf_start=[77÷64]×64+0=1*64=64. As illustrated by the scheduling of FIG. 1, the target NPDCCH repetitions is the second NPDCCH repetitions, and because the subframe corresponding to the numeral n_sf_start=64 is occupied by SIB1, the subframe 64 is not the actual start subframe (subframe 66 is the actual start subframe).

Figure 4:
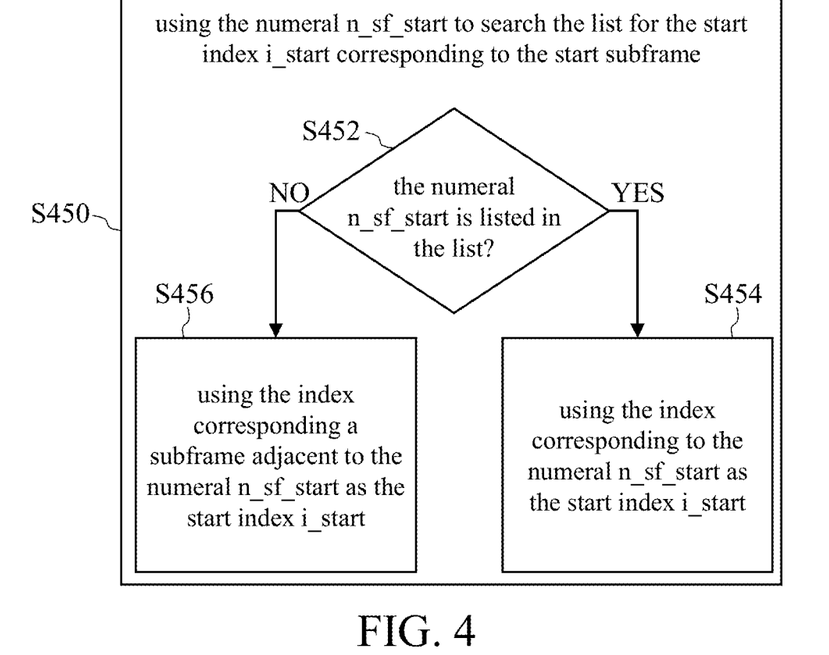
FIG. 4 illustrates a detailed flow of step S450 of FIG. 3.

Step S450: The calculation circuit 120 uses the numeral n_sf_start to search the list for the start index i_start corresponding to the start subframe. Reference is made to FIG. 4,

TABLE 1

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| subframe | 13 | 14 | 16 | 17 | 18 | 19 | 21 | 22 | 23 | 26 | 27 | 28 | 31 | 32 | 33 | 34 |

| index | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| subframe | 36 | 37 | 38 | 39 | 41 | 42 | 43 | 46 | 47 | 48 | 51 | 52 | 53 | 54 | 56 | 57 |

| index | 32 | 33 | 34 | 35 | 36 | 37 | 38 | 39 | 40 | 41 | 42 | 43 | 44 | 45 | 46 | ... |
|---|---|---|---|---|---|---|---|---|---|---|---|---|---|---|---|---|
| subframe | 58 | 59 | 61 | 62 | 63 | 66 | 67 | 68 | 71 | 72 | 73 | 74 | 76 | 77 | 78 | ... |

Each available subframe listed in the list may be used to carry NPDCCH and corresponds to an index. In some embodiments, monotonic increase or decrease can be seen in both the numerals of the available subframes and the indices, but the implementation is not limited to monotonic increase or decrease. In some embodiments, the list may be stored in the memory 130 in the form of an array, in which case the which is a detailed flow of step S450. In step S452, the calculation circuit 120 determines whether the numeral n_sf_start is listed in the list. If so, the calculation circuit 120 executes step S454. If not, the calculation circuit 120 executes step S456. In step S454, the calculation circuit 120 uses the index corresponding to the numeral n_sf_start as the start index i_start. More specifically, i_start is obtained in step S454 by calculating subfn2index(n_sf_start). For example, i_start=subfn2index(66)=37. In step S456, the calculation circuit 120 uses the index corresponding to an adjacent subframe whose numeral is closest to and not smaller than the numeral n_sf_start as the start index i_start. For example, the adjacent subframe whose numeral is closest to and not smaller than the numeral n_sf_start=64 is subframe 66, and the index of subframe 66 is i_start=37. In other words, i_start can be obtained in step S456 by calculating subfn2index(n_sf_start) as well, namely, i_start=subfn2index(64)=37. In step S450, the calculation circuit 120 may employ the binary search algorithm to find the start index i_start.

Step S460: The calculation circuit 120 searches the list for the target index i_target corresponding to the target subframe n_sf_target. Similar to the previous step, in cases where both the indices and the subframe numerals are monotonically increasing, the calculation circuit 120 searches the list for the index that is closest to and not smaller than the target subframe n_sf_target. When n_sf_target=77, i_target=subfn2index(77)=45.

Step S470: The calculation circuit 120 determines whether the target subframe n_sf_target is within the interval of the target NPDCCH repetitions based on the determination as to whether the difference between the start index i_start and the target index i_target is smaller than the maximum number of repetitions $R_{max}$. The interval of one NPDCCH repetitions refers to all the subframes between the start subframe and the end subframe of that NPDCCH repetitions. For example, in the example of FIG. 1, the interval of the first NPDCCH repetitions ranges from subframe 13 to subframe 34, and the interval of the second NPDCCH repetitions ranges from subframe 66 to subframe 98.

Figure 5:
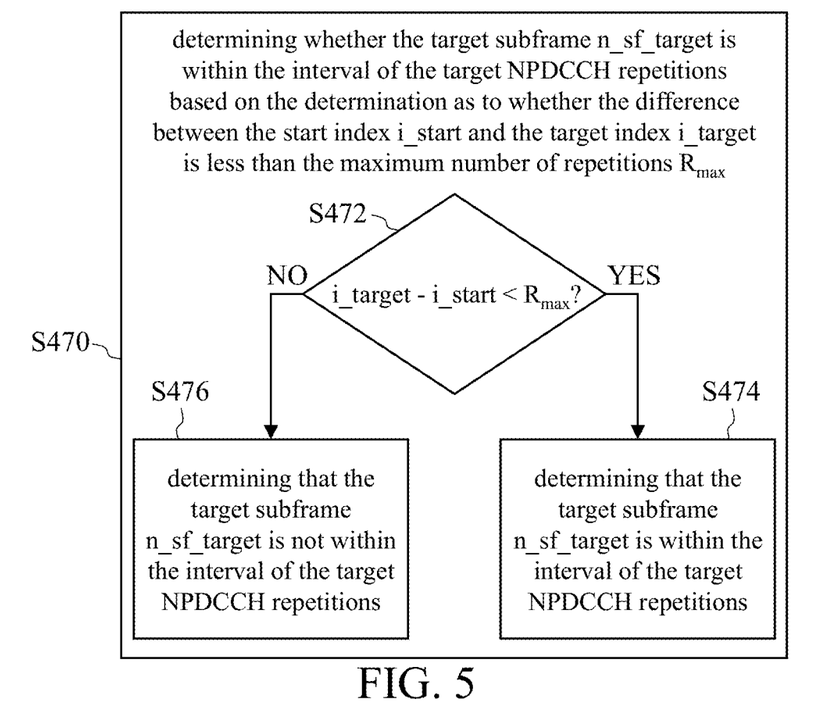
FIG. 5 illustrates a detailed flow of step S470 of FIG. 3.

Reference is made to FIG. 5, which is a detailed flow of step S470. In step S472, the calculation circuit 120 determines whether (i_target−i_start) is smaller than the maximum number of repetitions $R_{max}$, namely, whether the result of function distance(i_target, i_start) is smaller than $R_{max}$ (step S472). If so, the calculation circuit 120 determines that the target subframe n_sf_target is within the interval of the target NPDCCH repetitions (step S474). If not, the calculation circuit 120 determines that the target subframe n_sf_target is not within the interval of the target NPDCCH repetitions (step S476). Continuing with the above example, because distance(i_target, i_start)=45−37=8<$R_{max}$=16, the calculation circuit 120 can know for sure that the target subframe n_sf_target is within the second NPDCCH repetitions (as shown in FIG. 1, 66<n_sf_target=77<98).

Step S480: The calculation circuit 120 determines whether the target subframe n_sf_target is an NPDCCH candidate subframe based on the target index i_target and the numeral of the target subframe n_sf_target. The calculation circuit 120 first uses the target index i_target to search the list for the corresponding subframe n_sf temp (i.e., n_sf temp=index2subfn(i_target)), and then determines whether the numeral of the target subframe n_sf_target is the same as the numeral of the subframe n_sf temp. If so (i.e., n_sf_target=n_sf temp), the target subframe n_sf_target is an NPDCCH candidate subframe. If not (i.e., n_sf_target≠n_sf_temp), the target subframe n_sf_target is not an NPDCCH candidate subframe. For example, although the target subframes n_sf_target numbered 75 and 76 both correspond to the target index i_target=44 (i.e., subfn2index(75)=subfn2index(76)=44), the numeral of the subframe n_sf temp corresponding to the target index i_target=44 is 76 (i.e., index2subfn(44)=76). Therefore, the calculation circuit 120 can learn that the target subframe n_sf_target numbered 75 is not an NPDCCH candidate subframe and that the target subframe n_sf_target numbered 76 is an NPDCCH candidate subframe.

Step S490: The UE 100 receives the target subframe n_sf_target when it is determined that the target subframe n_sf_target is an NPDCCH candidate subframe.

Step S495: The UE 100 does not receive the target subframe n_sf_target when it is determined that the target subframe n_sf_target is not an NPDCCH candidate subframe.

Figure 6:
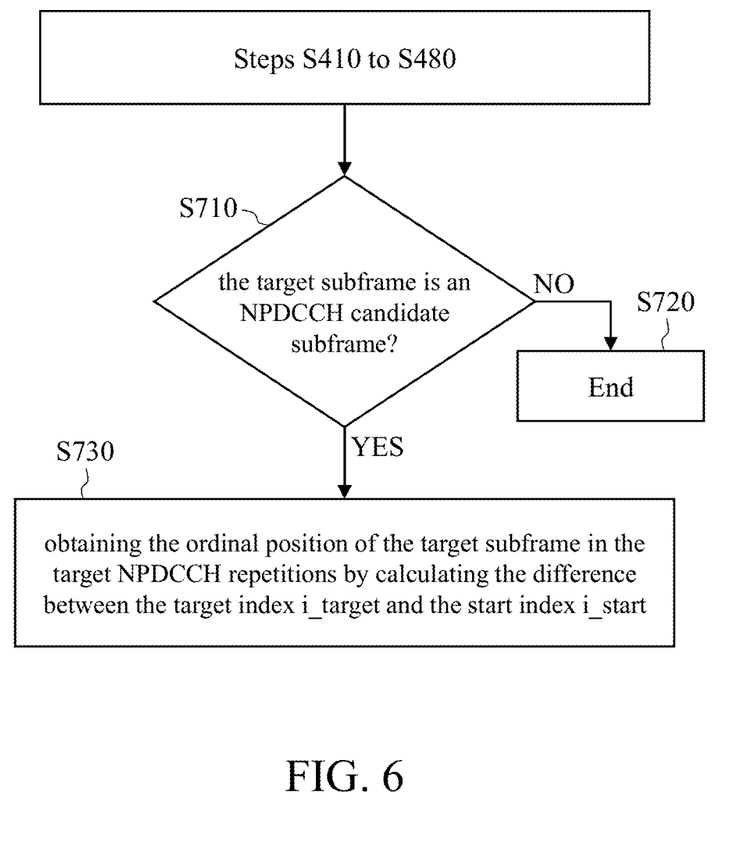
FIG. 6 illustrates a flowchart of determining the ordinal position of the target subframe in the target NPDCCH repetitions.

After finishing the steps S410 to S480 in FIG. 3, the calculation circuit 120 can know whether the target subframe n_sf_target is an NPDCCH candidate subframe. Next, the calculation circuit 120 determines the ordinal position of the target subframe in the target NPDCCH repetitions based on the flow of FIG. 6. If the calculation circuit 120 determines that the target subframe n_sf_target is not an NPDCCH candidate subframe (NO branch of step S710), the calculation circuit 120 ends the flow (step S720). If the calculation circuit 120 determines that the target subframe n_sf_target is an NPDCCH candidate subframe (YES branch of step S710), the calculation circuit 120 obtains the ordinal position of the target subframe in the target NPDCCH repetitions by calculating the difference between the target index i_target and the start index i_start (step S730). Continuing with the above example, distance(i_target, i_start)=45−37=8 means that the target subframe n_sf_target numbered 77 is the ninth (=8+1) subframe in the second NPDCCH repetitions.

Figure 7:
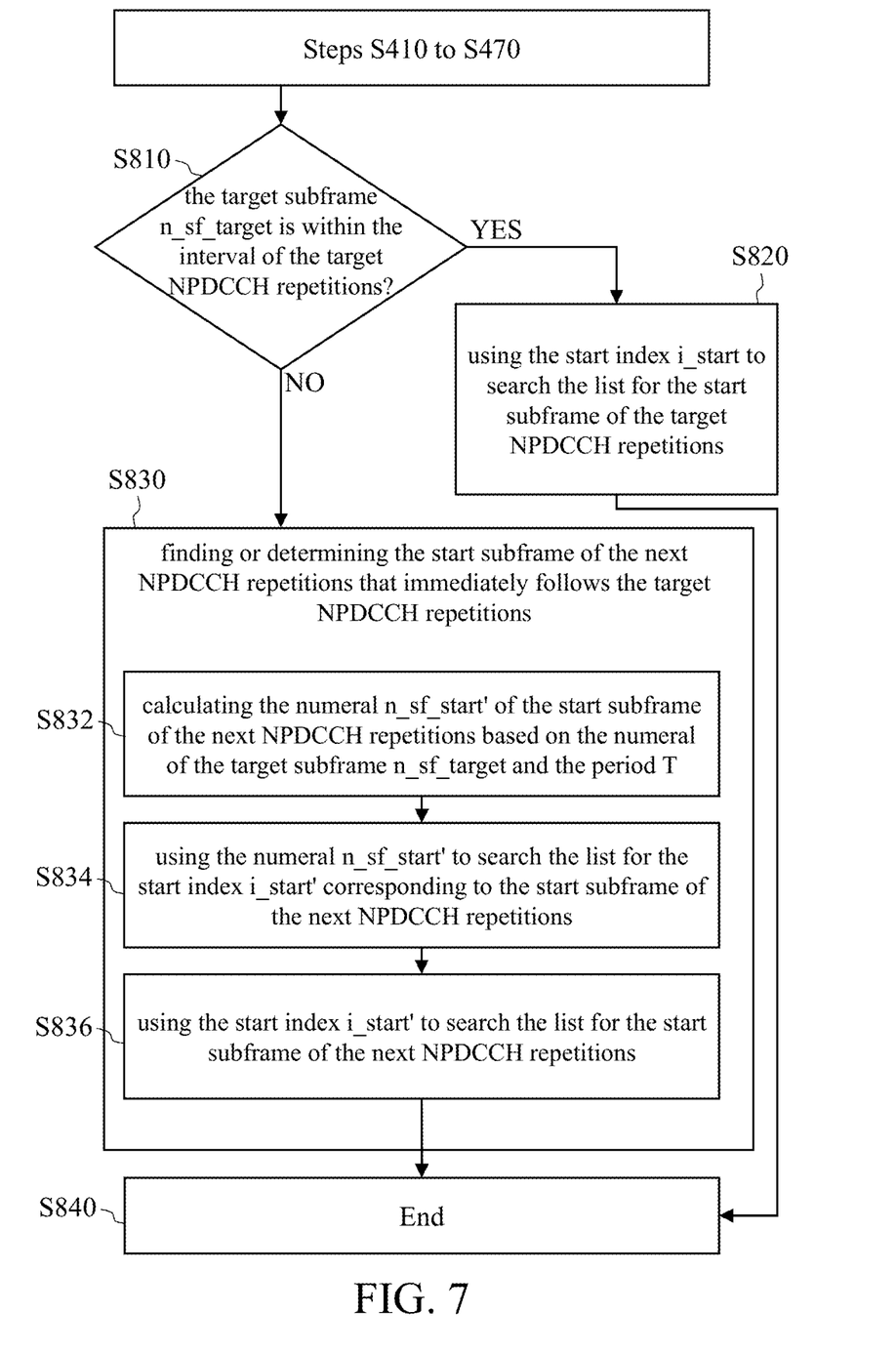
FIG. 7 illustrates a flowchart of the scheduling method for the UE according to another embodiment of the present invention.

FIG. 7 is a flowchart of the scheduling method for the UE according to another embodiment of the present invention. The calculation circuit 120 performs the flow of FIG. 7 to know the start subframe of the NPDCCH repetitions closest to the target subframe n_sf_target.

Step S810: The calculation circuit 120 determines whether the target subframe n_sf_target is within the interval of the target NPDCCH repetitions. If so, the calculation circuit 120 executes step S820. If not, the calculation circuit 120 executes step S830. The calculation circuit 120 ends the flow of FIG. 7 (step S840) after finishing step S820 or step S830.

Step S820: The calculation circuit 120 uses the start index i_start to search the list for the start subframe of the target NPDCCH repetitions. For instance, continuing with the above example, because the target subframe n_sf_target numbered 77 is within an NPDCCH repetitions (learned in step S470), in step S820 the calculation circuit 120 directly uses the start index i_start (=37) obtained in step S450 to conduct the search in the list for the subframe corresponding to the start index i_start (which subframe turns out to be 66, namely, index2subfn(37)=66). The subframe corresponding to the start index i_start is the start subframe of the target NPDCCH repetitions.

Step S830: The calculation circuit 120 finds or determines the start subframe of the next NPDCCH repetitions that immediately follows the target NPDCCH repetitions. Step S830 includes sub-steps S832, S834 and S836.

Step S832: The calculation circuit 120 calculates the numeral n_sf_start' of the start subframe of the next NPDCCH repetitions based on the numeral of the target subframe n_sf_target and the period T. In this step, the calculation circuit 120 may calculate the numeral n_sf_start' based on equation (2).

$$n\_sf\_start' = [n\_sf \div T] \times T + O \qquad (2)$$

For example, when the numeral of the target subframe n_sf_target is 44, the maximum number of repetitions $R_{max}$=16, the period T=64 and the offset O=0, the numeral n_sf_start'=[44÷64]×64+0=1*64=64. As shown in the scheduling of FIG. 1, the NPDCCH repetitions next to the target NPDCCH repetitions is the second NPDCCH repetitions, and the second NPDCCH repetitions immediately follows the first NPDCCH repetitions (i.e., no other NPDCCH repetitions is present between the first and second NPDCCH repetitions).

Step S834: The calculation circuit 120 uses the numeral n_sf_start' to search the list for the start index i_start' corresponding to the start subframe of the next NPDCCH repetitions. Continuing with the above example, the calculation circuit 120 uses the numeral n_sf_start'=64 to search the list, and the start index i_start'=37 is thus obtained (i.e., subfn2index(64)=37).

Step S836: The calculation circuit 120 uses the start index i_start' to search the list for the start subframe of the next NPDCCH repetitions. Continuing with the above example, the calculation circuit 120 uses the start index i_start'=37 to search the list, and the numeral of the start subframe (which is 66) is thus obtained (i.e., index2subfn(37)=66).

Figure 8:
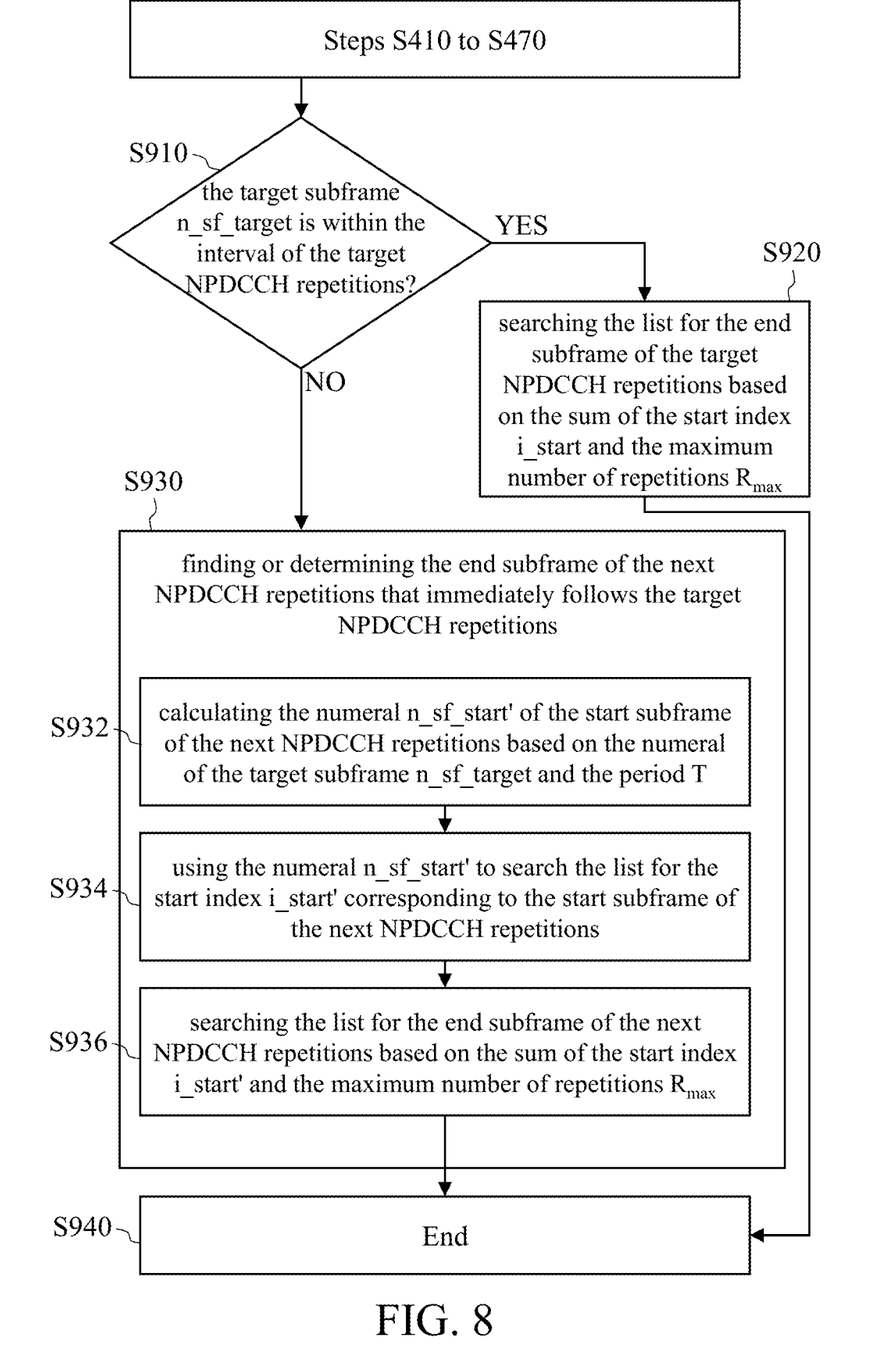
FIG. 8 illustrates a flowchart of the scheduling method for the UE according to another embodiment of the present invention.

FIG. 8 is a flowchart of the scheduling method for the UE according to another embodiment of the present invention. The calculation circuit 120 performs the flow of FIG. 8 to know the end subframe of the NPDCCH repetitions closest to the target subframe n_sf_target.

Step S910 is the same as step S810, and the details are thus omitted for brevity. The calculation circuit 120 ends the flow of FIG. 8 (step S940) after finishing step S920 or step S930.

Step S920: The calculation circuit 120 searches the list for the end subframe of the target NPDCCH repetitions based on the sum of the start index i_start and the maximum number of repetitions $R_{max}$. Taking the scheduling in FIG. 1 as an example, if the start index i_start=0, then i_start+$R_{max}$=0+16=16, and the subframe corresponding to the index 16 (which is the subframe 34) is the end subframe of the target NPDCCH repetitions (i.e., calculating index2subfn(add(i_start', $R_{max}$))).

Step S930: The calculation circuit 120 finds or determines the end subframe of the next NPDCCH repetitions that immediately follows the target NPDCCH repetitions. Step S930 includes sub-steps S932, S934 and S936. Steps S932 and S934 are the same as steps S832 and S834, respectively, and the details are thus omitted for brevity.

Step S936: The calculation circuit 120 searches the list for the end subframe of the next NPDCCH repetitions based on the sum of the start index i_start' and the maximum number of repetitions $R_{max}$ (i.e., calculating index2subfn(add(i_start', $R_{max}$))). The sum of the start index i_start' and the maximum number of repetitions $R_{max}$ is the index corresponding to the end subframe of the next NPDCCH repetitions, and so the index can be used to find the numeral of the end subframe.

In summary, by establishing a list and searching the list, the UE can save the efforts to check the subframes one by one and consequently operate at a higher speed.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A scheduling method for user equipment (UE) of Narrowband Internet of Things (NB-IoT), comprising:
   synchronizing with a cell;
   receiving at least one system information parameter from the cell, wherein the at least one system information parameter comprises a maximum number of repetitions, a period and an offset of Narrowband Physical Downlink Control Channel (NPDCCH) search spaces;
   establishing a list based on the at least one system information parameter, wherein a plurality of available subframes is directly or indirectly listed in the list, and each available subframe is labeled with an index;
   calculating a numeral of a start subframe of a target NPDCCH repetitions based on a numeral of a target subframe, the period and the offset;
   using the numeral of the start subframe to search the list for a start index corresponding to the start subframe;
   searching the list for a target index corresponding to the target subframe;
   determining whether the target subframe is within an interval of the target NPDCCH repetitions based on a determination as to whether a difference between the start index and the target index is smaller than the maximum number of repetitions; and
   determining whether the target subframe is an NPDCCH candidate subframe based on the target index and the numeral of the target subframe.

2. The method of claim 1, wherein the available subframes are sequentially arranged in the list, and the step of searching for the start index comprises:
   using the index corresponding to a subframe adjacent to the start subframe as the start index when the numeral of the start subframe is not listed in the list.

3. The method of claim 1, wherein the step of determining whether the target subframe is within the interval of the target NPDCCH repetitions comprises:
   determining that the target subframe is within the interval of the target NPDCCH repetitions when a difference between the start index and the target index is smaller than the maximum number of repetitions.

4. The method of claim 1, further comprising:
   calculating a difference between the target index and the start index to obtain an ordinal position of the target subframe in the target NPDCCH repetitions when the target subframe is the NPDCCH candidate subframe.

5. The method of claim 1, further comprising:
   receiving the target subframe when it is determined that the target subframe is the NPDCCH candidate subframe.

6. The method of claim 1, further comprising:
   not receiving the target subframe when it is determined that the target subframe is not the NPDCCH candidate subframe.

7. A scheduling method for user equipment (UE) of Narrowband Internet of Things (NB-IoT), comprising:
   synchronizing with a cell;
   receiving at least one system information parameter from the cell, wherein the at least one system information parameter comprises a maximum number of repetitions, a period and an offset of Narrowband Physical Downlink Control Channel (NPDCCH) search spaces;

establishing a list based on the at least one system information parameter, wherein a plurality of available subframes is directly or indirectly listed in the list, and each available subframe is labeled with an index;

calculating a numeral of a first start subframe of a target NPDCCH repetitions based on a numeral of a target subframe, the period and the offset;

using the numeral of the first start subframe to search the list for a start index corresponding to the first start subframe;

searching the list for a target index corresponding to the target subframe;

determining whether the target subframe is within an interval of the target NPDCCH repetitions based on a determination as to whether a difference between the start index and the target index is smaller than the maximum number of repetitions; and searching for the first start subframe of the target NPDCCH repetitions, or searching for a second start subframe of a next NPDCCH repetitions;

wherein the next NPDCCH repetitions immediately follows the target NPDCCH repetitions.

8. The method of claim 7, wherein the step of searching for the first start subframe or the second start subframe comprises:

using the start index to search the list for the first start subframe when the target subframe is within the interval of the target NPDCCH repetitions.

9. The method of claim 7, wherein the start index is a first start index, and the step of searching for the first start subframe or the second start subframe comprises:

performing following steps to search for the second start subframe when the target subframe is not within the interval of the target NPDCCH repetitions:

calculating a numeral of the second start subframe of the next NPDCCH repetitions based on the target subframe and the period;

using the numeral of the second start subframe to search the list for a second start index corresponding to the second start subframe; and using the second start index to search the list for the second start subframe.

10. A scheduling method for user equipment (UE) of Narrowband Internet of Things (NB-IoT), comprising:

synchronizing with a cell;

receiving at least one system information parameter from the cell, wherein the at least one system information parameter comprises a maximum number of repetitions, a period and an offset of Narrowband Physical Downlink Control Channel (NPDCCH) search spaces;

establishing a list based on the at least one system information parameter, wherein a plurality of available subframes is directly or indirectly listed in the list, and each available subframe is labeled with an index;

calculating a numeral of a start subframe of a target NPDCCH repetitions based on a numeral of a target subframe, the period and the offset;

using the numeral of the start subframe to search the list for a start index corresponding to the start subframe;

searching the list for a target index corresponding to the target subframe;

determining whether the target subframe is within an interval of the target NPDCCH repetitions based on a determination as to whether a difference between the start index and the target index is smaller than the maximum number of repetitions; and searching for a first end subframe of the target NPDCCH repetitions, or searching for a second end subframe of a next NPDCCH repetitions;

wherein the next NPDCCH repetitions immediately follows the target NPDCCH repetitions.

11. The method of claim 10, further comprising:

searching the list for the first end subframe based on a sum of the start index and the maximum number of repetitions when the target subframe is within the interval of the target NPDCCH repetitions.

12. The method of claim 10, wherein the start subframe is a first start subframe, and the start index is a first start index, the method further comprising:

performing following steps to search for the second end subframe when the target subframe is not within the interval of the target NPDCCH repetitions:

calculating a numeral of a second start subframe of the next NPDCCH repetitions based on the target subframe and the period;

using the numeral of the second start subframe to search the list for a second start index corresponding to the second start subframe; and searching the list for the second end subframe based on a sum of the second start index and the maximum number of repetitions.

* * * * *